3,308,125
QUATERNARY AMMONIUM ORTHOCHLORO MERCURI P TOLUENE SULFONATES
Reginald L. Wakeman, Philadelphia, Pa., and Edward Griffin Shay, Belle Mead, N.J., assignors, by mesne assignments, to Millmaster Onyx Corporation, New York, N.Y., a corporation of Delaware
No Drawing. Filed Apr. 29, 1964, Ser. No. 363,620
3 Claims. (Cl. 260—270)

The object of the present invention is the preparation of microbiologically active compounds by reaction of certain microbiologically active quaternary ammonium hydroxides or their water-soluble salts with mercury derivatives of aromatic acids or their water-soluble salts.

Typical of these mercury-bearing compounds are o-chloro-mercuriphenol, o-chloro-mercuri-p-toluenesulfonic acid, p-chloro-mercuribenzoic acid, anhydro-2-hydroxymercuri-3-nitrobenzoic acid, anhydro-o-hydroxymercuribenzoic acid and the like. The preparation of these compounds is known to the art and has been widely described in the literature.

The products of this invention conform, in general, with the following structure:

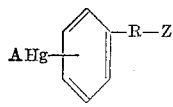

wherein Z is the cation of a microbiologically active quaternary ammonium compound, R may be O, COO, $SO_3$, and A may be OH, a halogen or the residue of an organic carboxylic acid group.

Typical examples of the quaternary ammonium compounds which may be used in this invention are the alkyl trimethyl ammonium chlorides, alkyl-benzyl trimethyl ammonium chlorides, alkyl dimethyl benzyl ammonium chlorides, alkyl dimethyl menaphthyl ammonium chlorides, alkyl dimethyl substituted-benzyl ammonium chlorides in which the benzyl radical is substituted with one or more side chains containing from 1 to 5 carbon atoms such, for example, as methyl, dimethyl, ethyl and the like and in which the carbon atoms may all be in the same or different side chains or in which the benzyl radical bears one, two or more halogen atoms such as chlorine or bromine, alkyl pyridinium chlorides, alkyl isoquinolinium chlorides and bromides, alkyl lower-alkyl pyrrolidinium chlorides, alkyl lower-alkyl morpholinium chlorides in all of which the alkyl group may have from 8 to 22 carbon atoms and the lower-alkyl group may have from 1 to 4 carbon atoms and alkyl phenoxy ethoxy ethyl dimethyl benzyl ammonium chloride in which the alkyl radical may be iso-octyl or nonyl and in which the phenyl radical may, if desired, be substituted by a methyl radical. Various other analogs of these quaternaries may also be employed such, for example, as cetyl dimethyl ethyl ammonium bromide or oleyl dimethyl ethyl ammonium bromide.

In general, the quaternary ammonium compounds useful in this invention are the higher alkyl quaternary ammonium hydroxides, halides (chlorides and bromides), sulfates, methosulfates and the like possessing the following formula:

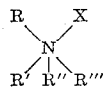

where R is an alkyl or alkaralkyl radical containing from 8 to 22 carbon atoms or an alkyl phenoxy ethoxy ethyl radical in which R is an alkyl radical containing from 8 to 9 carbon atoms and in which the phenyl radical may be substituted by a methyl group; R' and R'' are methyl or ethyl radicals or members of a heterocyclic ring system such as pyridine, isoquinoline, pyrrolidine and morpholine; R''' is a methyl radical or a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof or a menaphthyl group or hydrogenated menaphthyl group. When R' and R'' are members of a morpholine or pyrrolidine ring, R''' is a methyl, ethyl, propyl or butyl group. When R' and R'' are members of an unsaturated heterocyclic ring such as pyridine or isoquinoline, R''' is the same radical as R''. X in the above formula corresponds to a halide radical such as chloride, bromide or iodide or to any other water-soluble anion such as methosulfate.

In general, we prefer to use such quaternary ammonium compounds which have a phenol coefficient of at least 100 with respect to both *Staphylococcus aureus* and *Salmonella typhosa* at 20° C. when determined by the standard method given in the "Official Methods of Analysis of the Association of Official Agricultural Chemists," ninth edition (1960), pages 63 et seq.

The compounds of this invention may be prepared by mixing aqueous solutions of the quaternary ammonium salts or hydroxides with an aqueous solution of the mercuriated acid in question or any of its water-soluble salts.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in antimildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions, they retain their microbiological activity.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and nonionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungistat for seed and soil treatment against damping-off.

The microbiological activity of our compounds has been evaluated for microbiological stasis by the Standard Tube Dilution test, the technique for which is common knowledge to those skilled in the art. A Difco Bacto CSMA Broth #0826 was used in the study. This test is used to determine the lowest concentration of microbiologically active compounds which will inhibit the growth of the organism in question. For a wide range of applications, the inhibition of growth rather than outright kill is satisfactory.

Briefly put, the Tube Dilution test consists in placing 9 cc. of the CSMA Broth in a test tube which is then sterilized in an autoclave. One cc. solution of the microbiologically active compound at an appropriate concentration is added to the test tube which is then inoculated with 0.1 cc. of a twenty-four hour old culture of the organism under study. The test tube is then incubated at 37° C. for forty-eight hours and observed for bacterial growth.

The same procedure is followed for fungi. In such tests, however, the tubes are incubated for fourteen days at a temperature suitable for optimum fungal growth, usually 25° C.

The invention is illustrated by, but not limited to, the following examples:

*Example I*

A 1% stock solution was prepared of the potassium salt of o-chloro-mercuriphenol. An aliquot of this solution containing 0.0123 molecular weights of the compound was agitated vigorously while adding a chemically equivalent amount of a 10% aqueous solution of a commercial grade of alkyl dimethyl ethyl-benzyl ammonium chloride (Onyx Chemical Corporation's "BTC-471" in which the alkyl distribution is 50% $C_{12}$, 30% $C_{14}$, 17% $C_{16}$, 3% $C_{18}$). Benzene and sodium chloride were added to the mixture which separated into two phases in a separatory funnel. The organic product layer was removed and vacuum dried to yield 81% of the theory of alkyl dimethyl ethyl-benzyl ammonium o-chloro-mercuriphenate as a yellow paste.

*Example II*

An aliquot of the solution of the potassium o-chloromercuriphenate of Example I was treated in the same manner with a chemically equivalent amount of a 10% aqueous solution of alkyl dimethyl benzyl ammonium chloride (Onyx Chemical Corporation's "BTC-824" in which the alkyl distribution is 60% $C_{14}$, 30% $C_{16}$, 5% $C_{12}$, 5% $C_{18}$). The separated and dried product, alkyl dimethyl benzyl ammonium o-chloro-mercuriphenate, was obtained as a yellow paste in 86% of the theoretical yield.

*Example III*

In the same way, the potassium o-chloro-mercuriphenate of Example I was treated with a chemically equivalent amount of a 10% aqueous-alcohol solution of a commercial grade of alkyl isoquinolinium bromide (Onyx Chemical Corporation's "Isothan Q-75" in which the alkyl distribution is 50% $C_{12}$, 30% $C_{14}$, 17% $C_{16}$, 3% $C_{18}$). The alcohol was removed from the mixture by evaporation; benzene and salt solution were added and the whole transferred to a separatory funnel wherein it formed two phases. The organic product layer was removed and dried in vacuo. Alkyl isoquinolinium o-chloro-mercuriphenate was obtained in 76% of the theoretical yield as a deep red paste.

Example IV

Potassium o-chloro-mercuri-p-toluenesulfonate was dissolved in water at 0.25% concentration. An aliquot of this solution was reacted with a chemically equivalent amount of the solution of alkyl dimethyl ethyl-benzyl ammonium chloride of Example I. The mixture was allowed to stand for forty-eight hours and the precipitated product was filtered off. The yield was 72% of the theoretical of alkyl dimethyl ethyl-benzyl o-chloro-mercuri-p-toluenesulfonate as a light yellow solid.

Example V

In the same way, an aliquot of the solution of potassium o-chloro-mercuri-p-toluenesulfonate was reacted with a chemically equivalent amount of the solution of alkyl dimethyl benzyl ammonium chloride of Example II. The mixture was allowed to stand forty-eight hours after which the precipitated product was filtered off. It was a light yellow solid of alkyl dimethyl benzyl ammonium o-chloro-mercuri-p-toluenesulfonate in 76% of the theoretical yield.

Example VI

An aliquot of the solution of potassium o-chloro-mercuri-p-toluenesulfonate of Example IV was reacted in the same manner with a chemically equivalent amount of the solution of alkyl isoquinolinium bromide of Example III. The dried precipitate, alkyl isoquinolinium o-chloro-mercuri-p-toluenesulfonate, was recovered in 72% of the theoretical yield as a red solid.

Example VII

When tested by the Standard Tube Dilution test described above, these products gave the following values for static dilution. ($S.a.$=*Staphylococcus aureus*; $S.t.$=*Salmonella typhosa*; $A.n.$=*Aspergillus niger*.)

| | Reciprocal of Static Dilution vs.— | | |
|---|---|---|---|
| | $S.a.$ | $S.t.$ | $A.n.$ |
| Product of: | | | |
| Example I | $10^6$ | $10^5$ | $10^4$ |
| Example II | $10^6$ | $10^5$ | $10^5$ |
| Example III | $10^6$ | $10^5$ | $10^4$ |
| Example IV | $10^5$ | $10^4$ | $10^3$ |
| Example VI | $10^5$ | $10^4$ | $10^4$ |

We claim:
1. Alkyl dimethyl ethyl-benzyl ammonium o-chloro-mercuri-p-toluene sulfonate.
2. Alkyl dimethyl benzyl ammonium o-chloro-mercuri-p-toluene sulfonate.
3. Alkyl isoquinolinium o-chloro-mercuri-p-toluene sulfonate.

References Cited by the Examiner
UNITED STATES PATENTS

| | | | |
|---|---|---|---|
| 2,099,659 | 11/1937 | Reichel | 260—433 X |
| 2,129,376 | 9/1938 | Karasch | 260—433 |
| 2,309,691 | 2/1943 | Brannon | 260—567.6 |
| 2,411,815 | 11/1946 | Sowa | 260—433 |
| 2,502,382 | 9/1950 | Kaplan | 260—433 |
| 2,548,428 | 8/1951 | Fiedorek | 260—433 |

OTHER REFERENCES

Schwartz et al.: "Surface Active Agents and Detergents vol. 2," Interscience, 1958, page 222.

Whitmore: J. Am. Chem. Soc., vol. 48, p. 790 (1926).

ALEX MAZEL, *Primary Examiner*.

NICHOLAS S. RIZZO, HENRY R. JILES, *Examiners*.

D. G. DAUS, *Assistant Examiner*.